United States Patent [19]

Bergh et al.

[11] Patent Number: 5,447,971

[45] Date of Patent: Sep. 5, 1995

[54] TIRE WITH SILICA REINFORCED TREAD

[75] Inventors: Jean Bergh, Vianden; Marc Junio, Steinsel; Jean-Claude J. M. Kihn, Hollenfels, all of Luxembourg

[73] Assignee: The Goodyear Tire & Rubber Company, Akron, Ohio

[21] Appl. No.: 322,043

[22] Filed: Oct. 12, 1994

Related U.S. Application Data

[63] Continuation of Ser. No. 180,160, Jan. 11, 1994, abandoned, which is a continuation of Ser. No. 42,215, Apr. 2, 1993, abandoned.

[51] Int. Cl.$^6$ .......................... C08K 3/34; C08K 3/36; C08K 5/54; B60C 1/00
[52] U.S. Cl. ..................... 523/213; 524/492; 524/493; 524/495; 524/496; 524/261; 524/262; 525/236; 525/237; 152/209 R
[58] Field of Search ............... 523/213; 524/492, 493, 524/495, 496, 262, 261; 525/236, 237; 152/209 R

[56] References Cited

U.S. PATENT DOCUMENTS

| | | | |
|---|---|---|---|
| 3,184,160 | 6/1974 | Creasey | 152/330 |
| 4,430,466 | 2/1984 | Cooper | 524/262 |
| 5,087,668 | 2/1992 | Standstrom | 525/236 |
| 5,162,409 | 11/1992 | Mroczrowski | 524/262 |
| 5,300,577 | 4/1994 | Di Rossi et al. | 525/237 |

FOREIGN PATENT DOCUMENTS

| | | |
|---|---|---|
| 335726 | 3/1977 | Australia . |
| 524339 | 1/1993 | European Pat. Off. . |
| 61-218404 | 9/1986 | Japan . |

*Primary Examiner*—Paul R. Michl
*Assistant Examiner*—Olga Asinovsky
*Attorney, Agent, or Firm*—Henry C. Young, Jr.

[57] ABSTRACT

The invention relates to a tire with a tread which is reinforced with silica where the tread rubbers are of a blend of emulsion SBR with medium to high styrene content, isoprene/butadiene copolymer rubber, cis 1,4-polybutadiene rubber and natural rubber.

19 Claims, No Drawings

TIRE WITH SILICA REINFORCED TREAD

This is a continuation of patent application Ser. No. 08/180,160 filed Jan. 11, 1994, now abandoned, which was a continuation of original application Ser. No. 08/042,215, filed Apr. 2, 1993, now abandoned.

This invention relates to a tire having a rubber tread which is reinforced with silica. In one aspect, the tread is comprised of a specified multiple component rubber blend reinforced with a quantitative amount of silica or a combination of silica and carbon black.

BACKGROUND

Pneumatic rubber tires are conventionally prepared with a rubber tread which can be a blend of various rubbers which is typically reinforced with carbon black.

In one aspect, rubbers are evaluated, selected and blended for a purpose of achieving desired tire tread properties and particularly a balance of tire tread characteristic properties, mainly, rolling resistance, traction and wear.

For various applications utilizing rubber including applications such as tires and particularly tire treads, sulfur cured rubber is utilized which contains substantial amounts of reinforcing filler(s). Carbon black is commonly used for such purpose and normally provides or enhances good physical properties for the sulfur cured rubber. Particulate silica is also sometimes used for such purpose, particularly when the silica is used in conjunction with a coupling agent. In some cases, a combination of silica and carbon black is utilized for reinforcing fillers for various rubber products, including treads for tires.

It is important to appreciate that, conventionally, carbon black is considered to be a more effective reinforcing filler for rubber tire treads than silica if the silica is used without a coupling agent.

Indeed, at least as compared to carbon black, there tends to be a lack of, or at least an insufficient degree of, physical and/or chemical bonding between the silica particles and the rubber elastomers to enable the silica to become a reinforcing filler for the rubber for most purposes, including tire treads, if the silica is used without a coupler. While various treatments and procedures have been devised to overcome such deficiencies, compounds capable of reacting with both the silica surface and the rubber elastomer molecule, generally known to those skilled in such art as coupling agents, or couplers, are often used. Such coupling agents, for example, may be premixed, or pre-reacted, with the silica particles or added to the rubber mix during the rubber/silica processing, or mixing, stage. If the coupling agent and silica are added separately to the rubber mix during the rubber/silica mixing, or processing stage, it is considered that the coupling agent then combines in situ with the silica.

In particular, such coupling agents are generally composed of a silane which has a constituent component, or moiety, (the silane portion) capable of reacting with the silica surface and, also, a constituent component, or moiety, capable of reacting with the rubber, particularly a sulfur vulcanizable rubber which contains carbon-to-carbon double bonds, or unsaturation. In this manner, then the coupler acts as a connecting bridge between the silica and the rubber and thereby enhances the rubber reinforcement aspect of the silica.

In one aspect, the silane of the coupling agent apparently forms a bond to the silica surface, possibly through hydrolysis, and the rubber reactive component of the coupling agent combines with the rubber itself. Usually the rubber reactive component of the coupler is temperature sensitive and tends to combine with the rubber during the final and higher temperature sulfur vulcanization stage and, thus, subsequent to the rubber/silica/coupler mixing stage and, therefore, after the silane group of the coupler has combined with the silica. However, partly because of typical temperature sensitivity of the coupler, some degree of combination, or bonding, may occur between the rubber-reactive component of the coupler and the rubber during an initial rubber/silica/coupler mixing stages and, thus, prior to a subsequent vulcanization stage.

The rubber-reactive group component of the coupler may be, for example, one or more of groups such as mercapto, amino, vinyl, epoxy, and sulfur groups, preferably a sulfur or mercapto moiety and more preferably sulfur.

Numerous coupling agents are taught for use in combining silica and rubber, such as for example, silane coupling agents containing a polysulfide component, or structure, such as bis-(3-triethoxysilylpropyl) tetrasulfide.

For silica reinforced tire treads, U.S. Pat. No. 5,066,721, in its Comparative Test Example 1 in Table 3 (column 15), discloses the use of solution polymerization prepared SBR containing 50 parts silica for a tire tread. Table 4 (column 17) illustrates the tire preparation. EPO application No. 501227-A also discloses the use of a solution polymerization prepared SBR which is silica reinforced and in which is preferenced over an emulsion polymerization prepared SBR. U.S. Pat. No. 4,519,430 discloses a silica rich tire tread which contains solution or emulsion SBR, optionally with polybutadiene rubber and/or polyisoprene rubber together with a mixture of silica and carbon black, with silica being required to be a major component of the silica/carbon black reinforcing filler.

Other U.S. patents relating to silicas and silica reinforced tire treads include U.S. Pat. Nos. 3,451,458; 3,664,403; 3,768,537; 3,884,285; 3,938,574; 4,482,663; 4,590,052, 5,089,554 and British 1,424,503.

SUMMARY AND PRACTICE OF THE INVENTION

In accordance with this invention, a pneumatic tire is provided having a sulfur vulcanized tread comprised of, based on 100 parts by weight rubber, (A) diene-based elastomers comprised of (i) about 10 to about 80, preferably about 15 to about 60, phr of emulsion polymerization prepared styrene/butadiene copolymer rubber containing about 30 to about 45 percent styrene, (ii) about 10 to about 60, preferably about 35 to about 50, phr of an isoprene/butadiene copolymer rubber containing about 30 to about 70, preferably about 40 to about 60, weight percent isoprene, (iii) about 15 to about 30 phr of a cis 1,4-polybutadiene rubber, and (iv) about 0 to about 15, preferably about 5 to about 15, phr of cis 1,4-polyisoprene natural rubber, (B) about 50 to about 110, preferably about 60 to about 85, phr particulate silica, (C) at least one silica coupler having a silane moiety reactive with silicon dioxide and a sulfur moiety reactive with said elastomer, in a weight ratio of silica to coupler of about 7/1 to about 15/1, and (D) about 0 to about 50 phr carbon black, wherein the weight ratio of silica to carbon black, if carbon black is used, is at least 1/1 and preferably at least 4/1 and where the total of silica and carbon black, if used, is about 60 to about 120, preferably about 70 to about 90 phr.

In one aspect of the invention, a pneumatic tire is provided having a sulfur vulcanized tread comprised of, based on 100 parts by weight rubber, (A) dienebased elastomers comprised of (i) about 15 to about 60, preferably about 15 to about 35 phr of emulsion polymerization prepared styrene/butadiene copolymer rubber containing about 30 to about 45 percent styrene, (ii) about 35 to about 50 phr of an isoprene/butadiene copolymer rubber containing about 30 to about 70, preferably about 40 to about 60 weight percent isoprene, (iii) about 15 to about 30 phr of a cis 1,4-polybutadiene rubber, and (iv) about 5 to about 15 phr of cis 1,4-polyisoprene natural rubber, (B) about 50 to about 85, preferably about 60 to about 85, phr particulate silica, (C) at least one silica coupler having a silane moiety reactive with silicon dioxide and a sulfur moiety reactive with said elastomer, in a weight ratio of silica to coupler of about 7/1 to about 15/1, and (D) about 0 to about 50 phr carbon black, wherein the weight ratio of silica to carbon black, if carbon black is used, is at least 1/1, preferably at least 4/1 and for some applications at least 10/1 and where the total of silica and carbon black, if carbon black is used, is about 60 to about 120, preferably about 70 to about 90 phr.

The term "phr" as used herein, and according to conventional practice, refers to "parts of a respective material per 100 parts by weight of rubber".

The quatra rubber blend is an important feature of the invention designed to enhance properties of a tire tread containing a substantial amount of silica reinforcement.

In one aspect, the emulsion polymerization styrene/butadiene (E-SBR) is required to have a medium to relatively high styrene content. Such SBR is referred to herein as an E-SBR. The relatively high styrene content for the E-SBR is considered beneficial to enhance traction, or skid resistance, for the tire tread. The presence of the emulsion polymerization prepared SBR itself is considered beneficial to enhance processability of the uncured elastomer composition mixture, especially in comparison to a utilization of a solution polymerization prepared SBR.

By emulsion polymerization prepared E-SBR, it is meant that styrene and 1,3-butadiene are copolymerized as an aqueous emulsion. Such are well known to those skilled in such art.

The isoprene/butadiene copolymer rubber (IBR) is considered beneficial to reduce the tire's rolling resistance as also evidenced, on a predictability basis by a cured samples thereof exhibiting a suitable lower hysteresis as evidenced by Rebound values.

The IBR may be conveniently prepared, for example, by solution polymerization of isoprene and 1,3-butadiene under suitable polymerization conditions to achieve a desired Tg range, in its uncured state, of about $-20°$ C. to about $-50°$ C.. The Tg refers to the glass transition temperature which can conveniently be determined by a differential scanning calorimeter at a heating rate of 10° C. per minute.

The cis 1,4-polybutadiene rubber (BR) is considered to be beneficial to enhance the tire tread's wear, or treadwear.

Such BR can be prepared, for example, by organic solution polymerization of 1,3-butadiene.

The BR may be conventionally characterized, for example, by having at least a 90% cis 1,4-content.

The cis 1,4-polyisoprene natural rubber is well known to those having skill in the rubber art.

Thus, in the practice of this invention, a balanced quatra or tri rubber blend is provided which relies upon silica reinforcement which, in turn, relies on a silica coupler for the silica's reinforcing effect for the rubber blend.

In another aspect, when such sulfur vulcanized rubber tread also may contain carbon black a weight ratio of silica to carbon black is at least about 1.5/1, preferably at least about 4/1 and for some applications at least 10/1.

The commonly employed siliceous pigments used in rubber compounding applications can be used as the silica in this invention, including pyrogenic and precipitated siliceous pigments (silica), although precipitate silicas are preferred.

The siliceous pigments preferably employed in this invention are precipitated silicas such as, for example, those obtained by the acidification of a soluble silicate, e.g., sodium silicate.

The siliceous pigment (silica) should, for example, have an ultimate particle size in a range of 50 to 10,000 angstroms, preferably between 50 and 400 angstroms. The BET surface area of the pigment, as measured using nitrogen gas, is preferably in the range of about 100 to about 200, preferably about 120 to about 180, square meters per gram. The BET method of measuring surface area is described in the *Journal of the American Chemical Society*, Volume 60, page 304 (1930).

The silica also typically has a dibutylphthalate (DBP) absorption value in a range of about 200 to about 400, and usually about 250 to about 300.

The silica might be expected to have an average ultimate particle size, for example, in a range of about 0.01 to 0.05 micron as determined by the electron microscope, although the silica particles may be even smaller in size.

While the "projected" area of silicas, before and after mixing with rubber, has been sometimes taught to be suitable to characterize various silicas, it is considered that such characterizations are insufficient, or unreliable unless adequate sample preparation is designated and defined because the electron microscope determination of projected area of the silica is considered to be largely dependent upon sample preparation. Preparation variables include sample container size and mixing energy and need to be clarified in complete detail.

Various commercially available silicas may be considered for use in this invention such as, for example only and without limitation, silicas commercially available from PPG Industries under the Hi-Sil trademark with designations 210, 243, etc; silicas available from Rhone-Poulenc, with designations of Z1165MP and Z165GR and silicas available from Degussa AG with designations VN2 and VN3, etc. The Rhone-Poulenc Z1165MP silica is a preferred silica which is reportedly characterized by having a BET surface area of about 160–170 and by a DBP value of about 250–290 and by having a substantially spherical shape.

It is readily understood by those having skill in the art that the rubber composition of the tread rubber would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

Typically additions of carbon black, for this invention, if used, are hereinbefore set forth. Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others, such as, for example, those disclosed in the *Vanderbilt Rubber Handbook* (1978), pages 344-346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr, with a range of from about 1.5 to about 2.5, sometimes from 2 to 2.5, being preferred.

Accelerators are used to control the time and/or temperature required for vulcanization and to improve the properties of the vulcanizate. Retarders are also used the rate of vulcanization. In one embodiment, a single accelerator system may be used, i.e., primary accelerator. Conventionally and preferably, a primary accelerator(s) is used in total amounts ranging from about 0.5 to about 4, preferably about 0.8 to about 1.5, phr. In another embodiment, combinations of a primary or and a secondary accelerator might be used, with the secondary accelerator being used in amounts of about 0.05 to about 3 phr, for example, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound. The presence and relative amounts of sulfur vulcanizing agent and accelerator(s) are not considered to be an aspect of this invention which is more primarily directed to the use of silica as a reinforcing filler in combination with a coupling agent.

The presence and relative amounts of the above additives are not considered to be an aspect of the present invention which is more primarily directed to the utilization of specified blends of rubbers in tire treads, in combination with silica and silica coupler.

The tire can be built, shaped, molded and cured by various methods which will be readily apparent to those having skill in such art.

The invention may be better understood by reference to the following examples in which the parts and percentages are by weight unless otherwise indicated.

EXAMPLE I

A quatra rubber composition (compounded rubber) was prepared of a blend of E-SBR with a relatively high styrene content, isoprene/butadiene copolymer rubber (IBR), cis 1,4-polybutadiene rubber (BR) and cis 1,4-polyisoprene natural rubber (NR) and referred to herein as Sample X.

The rubber composition of Sample X was prepared by mixing the ingredients in several stages, namely, three non-productive stages (without the curatives) and a productive stage (for the curatives), then the resulting composition was cured under conditions of elevated temperature and pressure.

For the non-productive mixing stages, exclusive of the accelerator(s) and sulfur curatives which are mixed (added) in the final, productive mixing stage, about 38 weight percent of each of the ingredients, are mixed in the first non-productive mixing stage to a temperature of about 180° C. for about 4 minutes; about 38 weight percent of the ingredients were mixed (added) in the second non-productive mixing stage to a temperature of about 170° C. for about 2.5 to 3 minutes and about 24–25 weight percent of the ingredients were mixed (added) in the third non-productive mixing stage to a temperature of about 160° C. for about 3 minutes, all in a Banbury type rubber mixer. To the resulting rubber composition (mixture) was then mixed the curatives in a Banbury type mixer, namely, the accelerator(s) and sulfur to a temperature of about 20° C. for about 3 minutes. The rubber was then vulcanized at a temperature of about 150° C. for about 18 minutes.

The rubber composition was comprised of the ingredients illustrated in Table 1. Table 2 illustrates properties of the cured rubber composition.

TABLE 1

| Sample # | X |
|---|---|
| Non-Productive Mix Stages | |
| E-SBR[1] | 25 |
| IBR[2] | 45 |
| BR[3] | 20 |
| Natural Rubber[4] | 10 |
| Processing Oil[5] | 26.3 |
| Zinc Oxide | 2.5 |
| Fatty Acid | 3 |
| Antioxidant[6] | 3 |
| Silica[7] | 80 |
| Coupling Agent[8] | 12.8 |
| Productive Mix Stage | |
| Sulfur | 1.40 |
| Sulfenamide and Guanidine | 3.5 |

TABLE 1-continued

| Sample # | X |
|---|---|
| Type Accelerators | |

[1] Emulsion polymerization prepared SBR having a styrene content of about 41 percent of the type obtainable as 1721 from the Huels AG company.
[2] Isoprene/butadiene copolymer rubber having an isoprene content of about 50 percent obtained from The Goodyear Tire & Rubber Company, and a Tg of about −43° C.
[3] Cis 1,4-polybutadiene rubber obtained as Budene ® 1254 from The Goodyear Tire & Rubber Company.
[4] Natural rubber (cis 1,4-polyisoprene);
[5] Rubber processing oil as being 9.4 parts in the E-SBR and 5 parts in the PBd, where the amounts of E-SBR and PBd are reported above on a dry weight (without the oil) and in addition, about 11 parts additional rubber processing oil were added.
[6] Of the alkylaryl paraphenylene diamine type
[7] A silica obtained as Z1165MP from the Rhone-Poulenc company, and reportedly, having a BET surface area of about 165 and a DBP absorption value of about 260–280.
[8] obtained as bis-3-triethoxysilylpropyl)tetrasulfide (50% active) commercially available as X50S from Degussa as a 50/50 blend of the tetrasulfide with N330 carbon black (thus, considered 50% active).

TABLE 2

| Sample # | X | Y |
|---|---|---|
| Rheometer (150° C.) | | |
| Max. Torque | 39.2 | 40.2 |
| Min. Torque | 13.8 | 12.2 |
| $T_{90}$, minutes | 14.0 | 15.0 |
| $T_{25}$, minutes | 6.2 | 7.5 |
| Stress-Strain | | |
| Tensile Strength, MPa | 15.3 | 16.2 |
| Elongation at Break, % | 530 | 500 |
| 100% Modulus, MPa | 1.8 | 2.0 |
| 300% Modulus, MPA | 8.0 | 9.2 |
| Rebound | | |
| 100° C., (%) | 60 | 52 |
| 23° C. (%) | 39 | 28 |
| Hardness (Shore A) | | |
| 23° C. | 64 | 66 |
| Dynamic Mechanical Properties | | |
| at 50° C., MPa | 3.8 | 6.2 |
| Tan Delta at 50° C. | 0.16 | 0.25 |
| Tan Delta at −20° C. | 0.48 | 0.39 |

These properties of the rubber compositions demonstrate that anticipated rolling resistance and traction for a tire with tread of Sample X would be superior to those of Sample Y, which is considered a control as referenced in the following Example II.

EXAMPLE II

Pneumatic rubber tires are prepared of size 85/65/R15 steel belted radial ply tires, which have sulfur cured rubber treads composed of the rubber composition of the type illustrated as Experiment X of Example I.

Tire Y had a tread of a blend of natural rubber and solution polymers and reinforced with about 60 phr carbon black and which contained about 10 phr silica. It is used as a comparative control.

The tires were tested with the results shown in Table 3, with the values compared to those of the control which have been normalized to values of 100.

TABLE 3

| Tire Properties | X | Y |
|---|---|---|
| Rolling Resistance | 113 | 100 |
| Wet Skid | 107 | 100 |
| Wear | 123 | 100 |

A higher reported value above for the rolling resistance for tire X above is actually used to indicate an improved, or lower, rolling resistance for the tire and, thus, an indication of improved fuel economy for the vehicle.

The higher wet skid value reported for tire X is used to indicate a greater tire tread traction and thus a greater resistance to skidding under wet conditions.

The higher wear value reported for tire X is used to indicate a lower treadwear, thus, indicating a greater predicted tread life for tire X.

Thus, these Examples demonstrate that the aforesaid rolling resistance, wet skid resistance and wear for the X tire are considerably improved over the values for the control Y tire.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire is having a sulfur vulcanized tread comprised of, based on 100 parts by weight rubber, (A) diene-based elastomer consisting essentially of (i) about 10 to about 80 phr of emulsion polymerization prepared styrene/butadiene copolymer rubber containing about 30 to about 45 percent styrene, (ii) about 10 to about 60 phr of an isoprene/butadiene copolymer rubber containing about 30 to about 70 weight percent isoprene, (iii) about 15 to about 30 phr of a cis 1,4-polybutadiene rubber, and (iv) about 0 to about 15 phr of cis 1,4-polyisoprene natural rubber, (B) about 50 to about 110 phr particulate silica, and (C) at least one silica coupler having a silane moiety reactive with silicon dioxide and a sulfur moiety reactive with said elastomer, in a weight ratio of silica to coupler of about 7/1 to about 15/1.

2. The tire of claim 1 where said silica is characterized by having a BET surface area in a range of about 100 to about 200 and a DBP absorption value in a range of about 200 to about 400.

3. The tire of claim 1 wherein the said tread contains up to 50 phr carbon black, the weight ratio of silica to carbon black is at least 1/1 and the total of silica and carbon black is about 60 to about 120 phr.

4. The tire of claim 3 where the weight ratio of silica to carbon black is at least 10/1.

5. The tire of claim 1 where the said isoprene/butadiene copolymer rubber is characterized, in its uncured state by having a Tg in a range of about −20° C. to about −50° C.

6. The tire of claim 1 where the said coupler is a bis-3-(triethoxysilylpropyl)tetrasulfide.

7. A pneumatic tire having a sulfur vulcanized tread comprised of, based on 100 parts by weight rubber, (A) diene-based elastomers consisting essentially of (i) about 15 to about 60 phr of emulsion polymerization prepared styrene/butadiene copolymer rubber containing about 30 to about 45 percent styrene, (ii) about 35 to about 50 phr of an isoprene/butadiene copolymer rubber containing about 30 to about 70 weight percent isoprene, C(ii) about 15 to about 30 phr of a cis 1,4-polybutadiene rubber, and (iv) about 5 to about 15 phr of cis 1,4-polyisoprene natural rubber, (B) about 60 to about 110 phr particulate silica, and (C) at least one silica coupler having a silane moiety reactive with said elastomer in a weight ratio of silica to coupler of about 7/1 to about 15/1.

8. The tire of claim 7 where said silica is characterized by having a BET surface area in a range of about 100 to about 200 and a DBP absorption value in a range of about 200 to about 400.

9. The tire of claim 7 wherein the said tread contains up to 50 phr carbon black, the weight ratio of silica to carbon black is at least 4/1 and the total of silica and carbon black is about 70 to about 120 phr.

10. The tire of claim 7 where the said isoprene/butadiene copolymer rubber is characterized, in its uncured state by having a Tg in a range of about $-20°$ C. to about $-50°$ C.

11. The tire of claim 7 where the said coupler is a bis-3-(triethoxysilylpropyl)tetrasulfide.

12. A pneumatic tire having a sulfur vulcanized tread comprised of, based on 100 parts by weight rubber, (A) diene-based elastomers consisting essentially of (i) about 15 to about 60 phr of emulsion polymerization prepared styrene/butadiene copolymer rubber containing about 30 to about 45 percent styrene, (ii) about 35 to about 50 phr of an isoprene/butadiene copolymer rubber containing about 40 to about 60 weight percent isoprene, (iii) about 15 to about 30 phr of a cis 1,4-polybutadiene rubber, and (iv) about 5 to about 15 phr of cis 1,4-polyisoprene natural rubber, (B) about 60 to about 85 phr particulate silica, and (C) at least one silica coupler having a silane moiety reactive with silicon dioxide and a sulfur moiety reactive with said elastomer in a weight ratio of silica to coupler of about 7/1 to about 15/1.

13. The tire of claim 12, where said silica is characterized by having a BET surface area in a range of about 120 to about 180 and a DBP absorption value in a range of about 250 to about 300.

14. The tire of claim 12, where said silica is characterized by having a substantially spherical shape.

15. The tire of claim 12 wherein the said tread contains up to 50 phr carbon black, the weight ratio of silica to carbon black is at least 4/1 and the total of silica and carbon black is about 70 to about 120 phr.

16. The tire of claim 12 where the said isoprene/butadiene copolymer rubber is characterized, in its uncured state by having a Tg in a range of about $-20°$ C. to about $-50°$ C.

17. The tire of claim 12 where the said coupler is a bis-3-(triethoxysilylpropyl)tetrasulfide.

18. The tire of claim 15 where the ratio of silica to carbon black is at least 10/1.

19. The tire of claim 12 where said silica is characterized by having a BET surface area in a range of about 120 to about 180 and a DBP absorption value in a range of about 250 to about 300 and a substantially spherical shape; where the said coupler is a bis-3-(triethoxysilylpropyl)tetrasulfide and where the ratio of silica to carbon black is at least 10/1.

* * * * *